(No Model.)
J. W. BROWN.
CULTIVATOR FOR LISTED CORN.
No. 380,549. Patented Apr. 3, 1888.
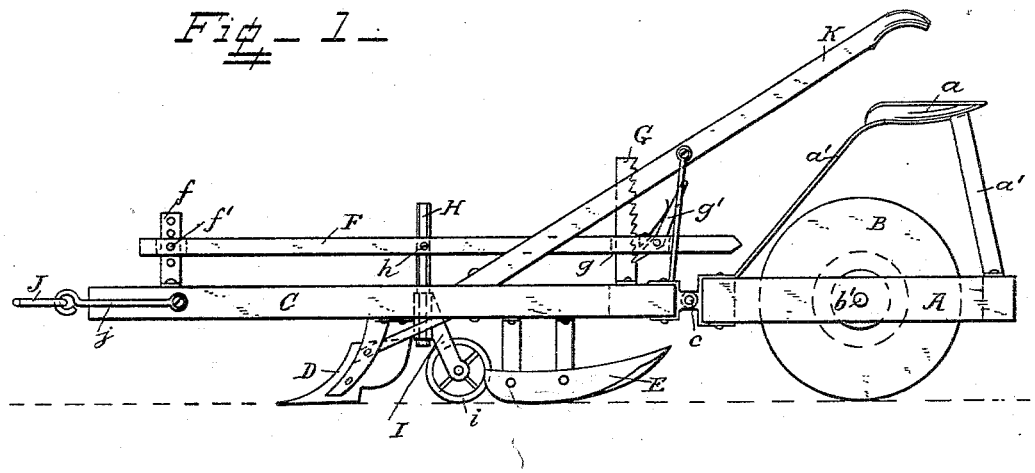
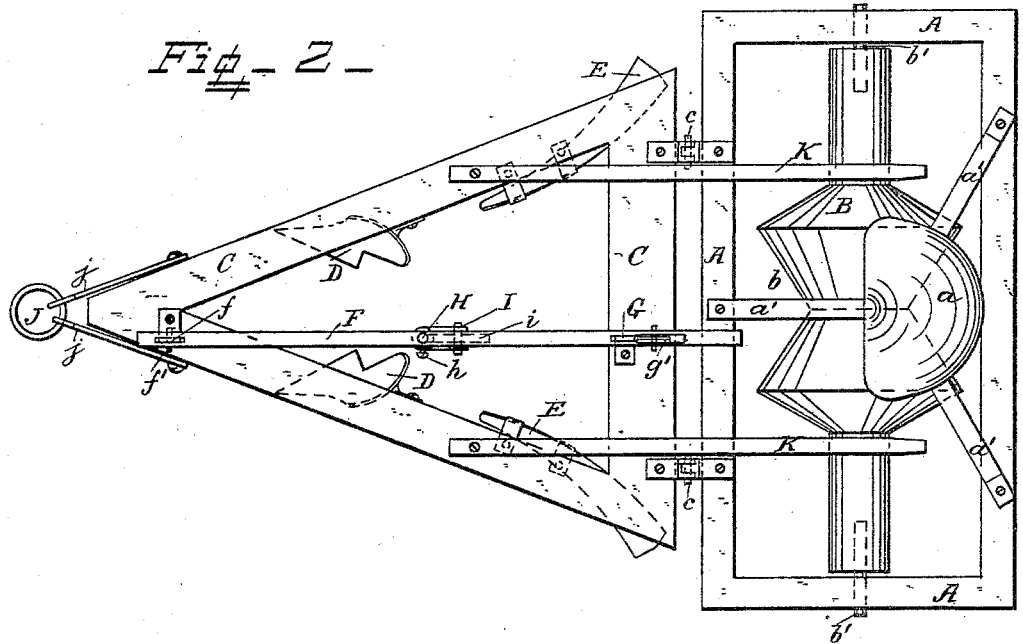
Witnesses.
W. L. Porter
H. M. Monroe
Inventor,
J. W. Brown.
By his Attorney,
Herbert W. T. Jenner.

UNITED STATES PATENT OFFICE.

JOSEPH W. BROWN, OF MILTONVALE, KANSAS.

CULTIVATOR FOR LISTED CORN.

SPECIFICATION forming part of Letters Patent No. 380,549, dated April 3, 1888.

Application filed September 1, 1887. Serial No. 248,515. (No model.)

*To all whom it may concern:*

Be it known that I, JOSEPH W. BROWN, a citizen of the United States, residing at Miltonvale, in the county of Cloud and State of Kansas, have invented certain new and useful Improvements in Cultivators for Listed Corn; and I do hereby declare the following to be a full, clear, and exact description of the invention, such as will enable others skilled in the art to which it appertains to make and use the same.

This invention relates to cultivators for listed corn; and it consists in the novel construction and combination of the parts hereinafter fully described and claimed, whereby a ridge of soft earth is thrown up in the center of the trench in which the corn is sown, and whereby two water-channels are formed, one upon each side of the corn.

In the drawings, Figure 1 is a side view of the cultivator, and Fig. 2 is a plan view of the same.

A is the main frame, to which the seat $a$ is secured by the supports $a'$.

B is a roller having the central groove, $b$, and journaled upon the pins $b'$ in the main frame.

C is a triangular frame pivoted to the main frame by the hinges $c$.

D are small plows secured to the front of frame C for throwing up a ridge of soft earth in the middle of the trench, and E are knife-blades secured to the diverging sides of the said frame in the rear of the plows D for scooping the water-channels.

The positions of the plows and scrapers may be varied, and other implements—such as harrow-teeth or weed-cutter knives—may be attached to the frame, so that the cultivator may be used in various stages of the growth of the corn. A seed-dropper for the corn may also be attached to the cultivator-frame, if desired.

F is a lever, the front end of which is adjustably pivoted by the pin $f'$ to the support $f$, which is secured to the frame C.

G is a notched upright working in the hole $g$ at the rear end of the lever, and $g'$ is a spring-catch pivoted to the lever and engaging with the notched upright for securing the lever in position.

H is a spindle projecting vertically through the lever and adjustably secured thereto by the screw $h$.

I is a caster provided with the wheel $i$ and swiveling upon the lower end of spindle H. The caster-wheel takes the weight of the frame C and allows the cultivator to deviate from a straight line and turn corners.

J is a ring pivotally connected to the frame C by the rods $j$ for drawing the cultivator along and adapting itself to various heights of draft.

K are handles firmly secured to the frame C, and projecting rearwardly on each side of the seat convenient to the grasp of the operator.

What I claim is—

1. In a cultivator, the combination of a main frame, a roller having a central groove journaled in the main frame, a triangular frame hinged to the main frame, cultivating implements secured to the diverging sides of the triangular frame, and a caster for taking the weight of the triangular frame.

2. In a cultivator, the combination of a main frame, a roller having a central groove journaled in the main frame, a triangular frame hinged to the main frame, cultivating implements secured to the diverging sides of the triangular frame, a lever pivotally connected to the triangular frame at one end, a notched support and a spring-catch connecting the rear end of the lever with the frame, an adjustable spindle projecting through the lever, and a caster swiveling upon the said spindle and taking the weight of the said triangular frame.

3. In a cultivator, the combination of a main frame, a roller having a central groove journaled in the main frame, a triangular frame hinged to the main frame, cultivating implements secured to the diverging sides of the triangular frame, a caster for taking the weight of the triangular frame, a ring pivotally connected to the front of the said frame and adapting itself to different heights of draft, and handles projecting rearwardly from the said triangular frame for regulating its height.

In testimony whereof I affix my signature in presence of two witnesses.

JOSEPH W. BROWN.

Witnesses:
CHARLES A. MIDDLESTATE,
E. A. RICE.